United States Patent [19]

Liston et al.

[11] Patent Number: 4,483,616

[45] Date of Patent: Nov. 20, 1984

[54] CONTAINER FOR SMALL QUANTITIES OF LIQUIDS

[75] Inventors: Max D. Liston, Irvine; Paul K. Hsei, Huntington Beach, both of Calif.

[73] Assignee: American Hospital Supply Corporation, Evanston, Ill.

[21] Appl. No.: 400,192

[22] Filed: Jul. 20, 1982

Related U.S. Application Data

[63] Continuation-in-part of Ser. No. 284,980, Jul. 20, 1981, abandoned.

[51] Int. Cl.[3] .......... G01N 1/10

[52] U.S. Cl. .......... 356/246; 422/102

[58] Field of Search .......... 356/244, 246, 440; 435/296; 422/102; 128/760, 763; 250/576

[56] References Cited

U.S. PATENT DOCUMENTS

| | | | |
|---|---|---|---|
| 2,252,750 | 8/1941 | Basch | 422/102 X |
| 2,302,830 | 11/1942 | Axelrad | 350/95 |
| 3,493,306 | 2/1970 | Mayer | 356/246 |
| 3,807,955 | 4/1974 | Note, Jr. et al. | 422/102 X |
| 3,942,717 | 3/1976 | Robison | 422/102 X |
| 4,015,941 | 4/1977 | Kurata | 422/102 |
| 4,021,124 | 5/1977 | Sarstedt | 356/246 |

*Primary Examiner*—Davis L. Willis
*Assistant Examiner*—Matthew W. Koren
*Attorney, Agent, or Firm*—John H. Faro

[57] ABSTRACT

A container for holding a small quantity of liquid. The container comprises an elongated housing having a fluid receptacle disposed in the upper end thereof. The dimensions of the receptacle are substantially less than the overall dimensions of the housing, thereby facilitating the handling of the container and inhibiting evaporation of the liquid therein.

4 Claims, 10 Drawing Figures

CONTAINER FOR SMALL QUANTITIES OF LIQUIDS

This application is a continuation-in-part of copending application Ser. No. 284,980 filed on July 20, 1981 now abandoned.

BACKGROUND OF THE INVENTION

Biological fluids are routinely analyzed in hospital clinical laboratories to aid in the diagnosis of disease and to provide critical information about a patient's well-being. The constituents of blood, lymph, urine, or products derived therefrom provide meaningful patient health information to a clinician or physician. Since physicians are becoming increasingly dependent on clinical laboratory analyses for the diagnosis of disease and the monitoring of therapy, improved reliability and efficiency of these procedures is mandatory. Automation of the chemical analysis of biological fluid constituents has solved a great many of the problems associated with conducting reliable and efficient analyses; however, automated analysis has created its own dilemmas for the clinician. Since the handling and processing of a large number of fluid samples on a continuous basis with a rapid turnaround or completion time is required, many of the automated clinical analyzers presently available have been designed to monitor the chemical analyses rapidly. However, the processing of the biological fluid and its manipulation prior to delivery to the analyzer significantly retards the rate of the overall analysis. The processing and manipulation steps generally include the centrifugation of blood or filtration of biological fluids followed by serial dilutions and transfer to a cuvette or sample container.

Biological fluids, such as blood, are usually collected in a standard collection tube. Conventional blood collection tubes used in many hospitals and clinics are elongated cylindrical containers having an opening at one end fitted with a resilient stopper, and a rounded or flat bottom at the other end. The most common size of these blood collection tubes accommodates 10 milliliters of blood or other biological fluid. Illustrative of such blood collection tubes is the VACUTAINER* brand sold by Becton-Dickinson (*Registered Trademark of Becton-Dickinson). A phlebotomist first obtains a specimen of a patient's blood, appropriately labels the patient's specimen, and delivers the specimen to the clinical laboratory for analysis. The plasma or serum derived therefrom is processed and analyzed either manually, semi-automatically, or automatically. In the majority of cases, the specimen must first be dispensed from the collection tube to a sample test tube or cuvette as described above.

Furthermore, in certain instances where only minute quantities of biological fluid are available for analysis, such as in pediatric or geriatric analysis, the fluid cannot be collected and stored in large specimen tubes as described above because the sample level in such containers would not be adequate for retrieval prior to analysis. Such small quantities of fluids also have a tendency to significantly evaporate when stored in large containers, thus concentrating the chemical and enzymatic constituents therein. This results in erroneous analytical results and could possibly affect the diagnosis and treatment given the patient. Therefore, it is necessary to employ small-volume containers which inhibit evaporation for the storage and delivery of minute fluid samples in the clinical chemistry laboratory. Although various fluid-containers are available for this purpose, their small overall size and shape make handling extremely cumbersome. Furthermore, their use in conventional storage racks or those designed for loading into automatic chemical analyzers is precluded because of their small dimensions.

Certain automated chemical analyzers are capable of utilizing standardized conventional specimen containers as a means for introducing a patient's specimen into the analyzer. However, they are not equipped to handle specimen containers designed to hold small quantities of fluid. Therefore, one such instrument manufacturer requires that a separate sample cup be placed in the top of a standard-sized 10 milliliter collection tube for withdrawal of specimen and delivery to the analyzer. This creates several drawbacks for the rapid and reliable processing of a patient's specimen. One problem being the additional error-prone and time-consuming step of transferring the specimen from the specimen container to the sample cup, and another being the size requirements of the sample cups which contributes to significant evaporation of smaller fluid samples and which do not permit handling of small or micro quantities of fluid sample. Arrangements such as this are also prone to sample spillage due to dislodgements of the sample cup from the top of the container.

Heretofore, a micro-container for holding minute quantities of biological fluids, which could simultaneously be easily manipulated and employed in both conventional and automatic storage racks, has not been available.

SUMMARY OF INVENTION

In accordance with the present invention, disclosed is a container for holding a small quantity of liquid, said container comprising an elongated housing having top and bottom end portions; and a fluid receptacle disposed at said top portion formed integral with said housing, the dimensions of said receptacle being substantially less than the dimensions of said housing.

DETAILED DESCRIPTION OF THE PREFERRED EMBODIMENT

A micro-container has been developed in accordance with the present invention which overcomes the above-described problems associated with known containers designed for holding small sample volumes. The micro-container of the present invention is not only useful for storage of biological fluids in conventional test tube storage racks, but is also useful in storage racks especially designed for use in automated chemical analyzers since their overall dimensions are similar to those of standard blood collection tubes. Furthermore, the micro-containers of the present invention are easily handled by a laboratory technician, resulting in a rapid and reliable processing of fluid specimens for analysis.

Figure 1:
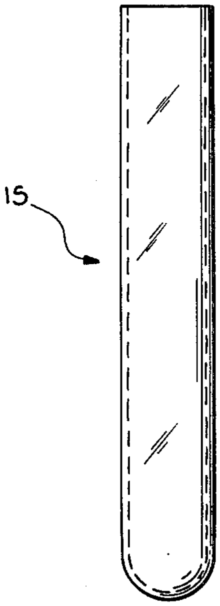
FIG. 1 (PRIOR ART)
FIG. 1 is a side plan view of a standard-sized sample container constructed in accordance with the prior art.

Although containers of various shapes are contemplated in accordance with the present invention, the preferred containers are cylindrical. As shown in FIGS. 2 through 7, a preferred micro-container of the present invention comprises an elongated cylindrical housing 10 having a top 12 and bottom 14 end portion and general dimensions similar to the standard sample collection tube 15 shown in FIG. 1. Thus, the clinician is able to conveniently grasp the micro-container by its elongated housing portion 10 as he or she would a conventional container. This facilitates overall processing of the fluid samples since a clinician routinely handles a large number of tubes in a single day, and thus his efficient operation is not hampered by the manipulation of small, odd-sized containers. The elongated housing also provides an adequate area for positioning of labels or other means of identification on the container to facilitate positive sample identification in an automated clinical analyzer. In addition, the elongated cylindrical housing acts as a permanent support for the micro-container such that tipping of the container and subsequent spillage of precious sample is avoided.

Figure 4:
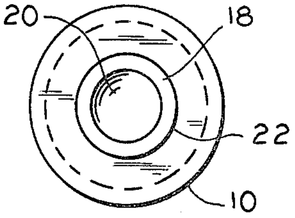
FIG. 4 is a top view of the container shown in FIG. 2.
Figure 2:
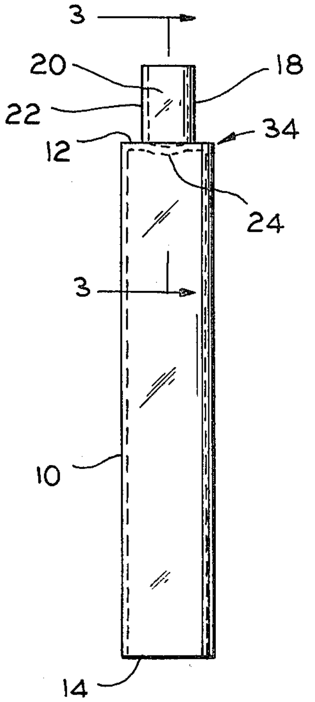
FIG. 2 is a side plan view of a container for small quantities of liquids constructed in accordance with an embodiment of the present invention.
Figure 3:
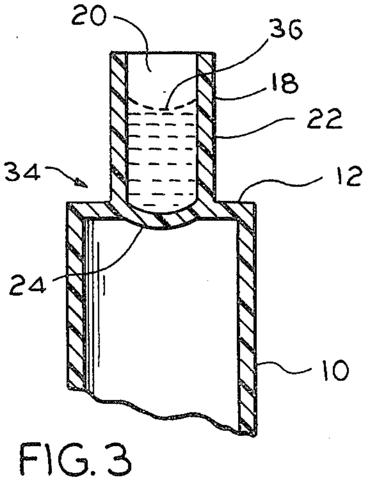
FIG. 3 is a partial, side sectional view of the container shown in FIG. 2 taken along line 3—3 thereof.

Disposed at the top end portion 12 of the elongated cylindrical housing 10 is a fluid receptacle 18, for holding small quantities of liquid. In one embodiment of the present invention, as shown in FIGS. 2–4, the receptacle 18 comprises and open-topped enclosure member 20 projecting upwardly from the top 12 of the housing 10. In this embodiment, the receptacle includes an upstanding cylindrical wall portion 22 extending from the top 12 of said housing 10, and a curved, preferably concave bottom portion 24 adjacent to and integral with the bottom portion of cylindrical enclosure member 20. The dimensions of the receptacle are substantially less than the dimensions of said housing 10, and preferably has a cross-sectional area substantially smaller than that of the housing in order to inhibit evaporation. In the preferred embodiment, enclosure member 20 has an inner volume of approximately 0.6 cubic centimeters to approximately 1.2 cubic centimeters. Furthermore, the wall portion 22 of enclosure member 20 is preferably high enough to contain small amounts of sample at the bottom-most portion thereof and still have enough head space to avoid spillage or evaporation of said sample. In one use of the present invention, this head space is also necessary for determining the meniscus level of the fluid contained therein. Generally, the liquid volume size of enclosure member 20 will be less than 1 milliliter.

Figure 7:
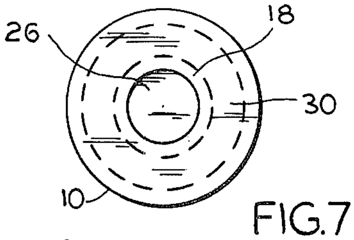
FIG. 7 is a top view of the container shown in FIG. 5.
Figure 5:
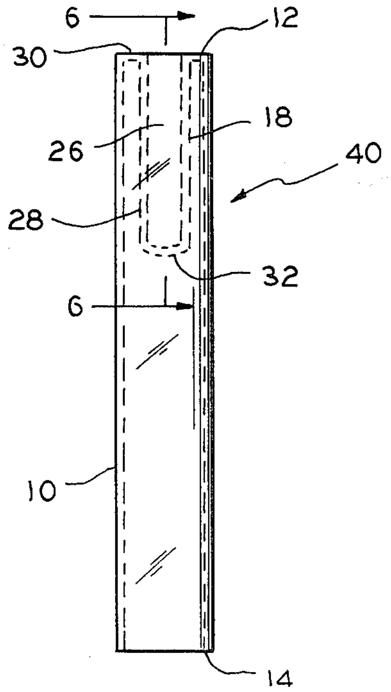
FIG. 5 is a side plan view of an alternate embodiment of a container for small quantities of liquids constructed in accordance with the present invention.
Figure 6:
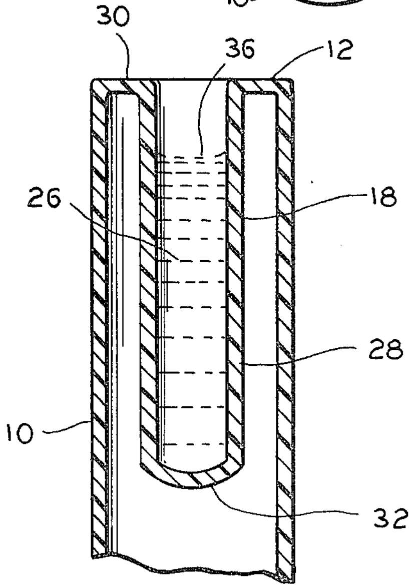
FIG. 6 is a partial, side sectional view of the container shown in FIG. 5 taken along line 6—6 thereof.

In a more preferred embodiment of the present invention, as shown in FIGS. 5–7, the fluid receptacle 18 comprises a cavity 26 formed within and integral with the top end 12 of the cylindrical housing 10. The cavity 26 includes a cylindrical wall portion 28 depending downwardly into the housing 10 and extending from a horizontal top wall portion 30 of said housing, and a curved, preferably concave bottom portion 32 adjacent to and integral with the bottom of portion of said cylindrical cavity. Again, the dimensions of the cavity are substantially less than the dimensions of said housing and preferably the cross-sectional area of the cavity is substantially smaller than that of the housing. The depth of the cavity walls 28 can be increased substantially more than the height of the wall portion 22 of enclosure member 20 of the alternate embodiment described above since the overall height of the container need not be changed.

An additional advantage of the embodiment of FIGS. 5 and 6 of present invention is that the shoulder region 34 between the receptacle and housing as shown in FIGS. 2 and 3 is eliminated. Although this would not affect the use of the containers in most procedures, it has been found that the embodiment shown in FIGS. 5 and 6 is more ideally suited for use in automated chemical analyzers such as described in co-pending application Ser. No. 284,840, filed July 20, 1981 now abandoned. In that application, a level-sensing device is disclosed which controls the elevation of the liquid level 36 in the sample containers to a predetermined height. The elevation of the containers to this predetermined height facilitates the dispensing of the sample from the container to the cuvettes in the chemical analyzer. Associated with the level-sensing device is an optical means for determining the height of the air-fluid interface or meniscus level 36 in the container. The micro-container shown in FIGS. 2–4 has an additional interface or shoulder 34 between the open-topped enclosure 20 and the cylindrical housing 10 which may produce a false signal by deflecting the path of the light beam to the optical means. This potential problem can be eliminated with the use of the micro-container shown in FIGS. 5–7 since this additional interface or shoulder 34 is eliminated. In addition, this shoulder may also interfer with the mechanical handling of the micro-container by the automated instrument.

Figure 8:
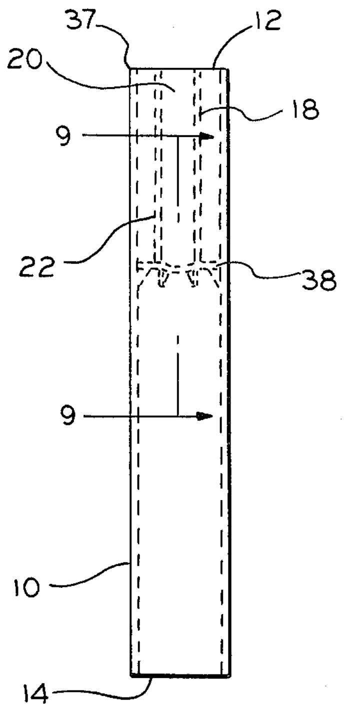
FIG. 8 is a side plan view of a container constructed in accordance with an alternate embodiment of the present invention.
Figure 10:
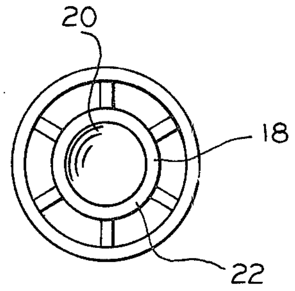
FIG. 10 is a top view of the container shown in FIG. 8.
Figure 9:
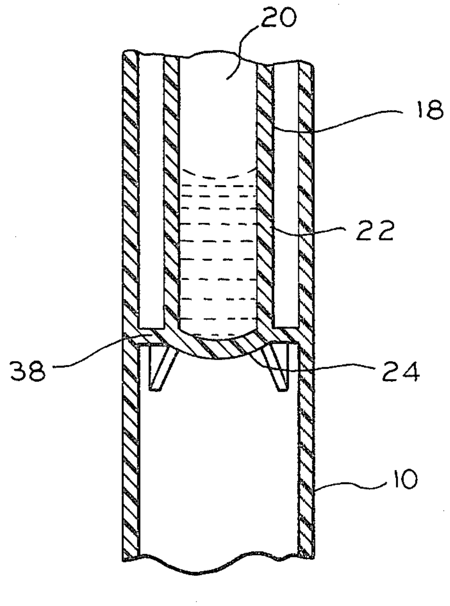
FIG. 9 is a partial, side sectional view of the container shown in FIG. 8 taken along line 9—9 thereof.

In the most preferred embodiment of the present invention, as shown in FIGS. 8–10, the fluid receptacle 18 comprises an open-topped enclosure member 20 projecting upwardly from an interface 38 positioned between the top 12 and bottom 14 end portions of the housing 10. Preferably the enclosure member projects upwardly from the interface to the top edge 37 of the housing. In this embodiment, the receptacle includes an upstanding cylindrical wall portion 22 extending from the interface 38, and a curved, preferably concave bottom portion 24 adjacent to and integral with the bottom portion of the enclosure member 20. The interface 38 should be positioned in the housing 10 at a level which does not interfere with the meniscus-sensing device described above. In the preferred embodiment, the enclosure member has an inner volume of approximately 1.0 cubic centimeters; wherein the height of the fluid receptacle is about 1.3 inches and an inner diameter of about 0.2 inches. Positioning of the fluid receptacle 18 inside of the housing has the advantage that the interface can be lowered, and the outer wall of the housing 10 has the same dimensions as the conventional sample tubes. Furthermore, the top end portion 12 does not require a horizontal top wall portion which might interfere with the meniscus-sensing device.

For costs reasons the micro-containers of the present invention may be formed by injection molding of polystyrene or other suitable plastics, although other non-plastic materials are also suitable for forming the micro-containers. The container of one embodiment of the present invention must be capable of transmitting light, and preferably has a polished upper portion 40 so as to efficiently transmit light without scattering thereof. Furthermore, it may also be desirable to form the micro-container of glass or other such non-permeable material so that the sample may be directly vacuum drawn therein.

In accordance with the preferred embodiment of the present invention, the overall dimensions of the micro-container permit it to be used in automated clinical analyzers which are designed to employ conventional blood collection tubes, and the smaller cross-sectional dimensions of the receptacle prevents evaporation of fluid due to currents of air passing thereover. Thus, the receptacle should preferably have sufficient depth to minimize the convention of air, and in keeping with the micro-sample requirements, the diameter of the receptacle should be substantially smaller than that of the housing to insure an adequate fluid height for dispensing of specimen therefrom.

In one embodiment of the present invention illustrated in FIGS. 5–7, the overall diameter of housing 10 is about 0.625 inches, and it has a height of about 4.0 inches. The horizontal wall portion 30 of the housing has a length of 0.188 inches, and the corresponding diameter of fluid receptacle 18 is about 0.250 inches. The length of the downwardly depending cylindrical wall portion 28 of the cavity is about 1.3 inches.

The present invention has been described in detail in terms of the preferred embodiments; however, it will be obvious to those skilled in the art that various modifications can be made without departing from the spirit and scope of the invention as defined in the appended claims.

We claim:

1. A micro-container adapted for use in an automated clinical analyzer, said clinical analyzer having a sample holder for acceptance of a blood collection tube and equipped with a device for sensing the meniscus level of a fluid sample in said micro-container, said micro-container comprising:

an elongated cylindrical housing having an open end, the overall dimensions of such housing being essentially the same as the collection tube;

a fluid receptacle disposed within and, integral with said housing through a common interface, said receptacle having an essentially elongated cylindrical sidewall, an open top-end and a closed bottom-end, the open top-end of said receptacle being substantially smaller in cross-sectional area than the open top-end of said housing and at essentially the same level as the open top-end of said housing; and said interface supporting the fluid receptacle within said housing, said interface consisting essentially of support means positioned below a design level of the meniscus of the fluid sample to be stored in such receptacle.

2. The micro-container of claim 1 wherein the fluid receptacle projects from the interface to the top edge of the housing.

3. The micro-container of claim 1 wherein the container is constructed of optically-transmissive plastic having a polished upper portion which minimizes the scattering of light therethrough.

4. The micro-container of claim 1 wherein the housing has a diameter of about 0.625 inches, a height of about 4.0 inches, and the upwardly projecting fluid receptacle has a height of about 1.3 inches and an inner diameter of about 0.2 inches.

* * * * *